US010384127B1

(12) United States Patent
Yu et al.

(10) Patent No.: US 10,384,127 B1
(45) Date of Patent: *Aug. 20, 2019

(54) CONSIDERATION-BASED NON-PLAYER CHARACTER COUNSELING

(71) Applicant: Electronic Arts Inc., Redwood City, CA (US)

(72) Inventors: Kenneth Yu, Menlo Park, CA (US); Tian Lan, Alviso, CA (US); Bing Liu, Alviso, CA (US); Sainath Shenoy, Fremont, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,002

(22) Filed: Jun. 2, 2017

Related U.S. Application Data

(63) Continuation of application No. 13/736,814, filed on Jan. 8, 2013, now Pat. No. 9,672,190.

(51) Int. Cl.
*A63F 13/5375* (2014.01)
*G06F 17/00* (2019.01)
*H04L 29/08* (2006.01)
*G07F 17/32* (2006.01)
(Continued)

(52) U.S. Cl.
CPC .......... *A63F 13/5375* (2014.09); *A63F 13/85* (2014.09); *A63F 13/86* (2014.09); *G06F 17/00* (2013.01); *G07F 17/32* (2013.01); *G07F 17/323* (2013.01); *H04L 67/22* (2013.01); *H04L 67/306* (2013.01); *A63F 2300/305* (2013.01)

(58) Field of Classification Search
None
See application file for complete search history.

(56) References Cited

U.S. PATENT DOCUMENTS 7,814,041 B2   10/2010   Caporale et al.
2002/0127527 A1   9/2002   Okamoto
(Continued)

OTHER PUBLICATIONS

"Dog (Fable II)", Dog (Fable II)—The Fable Wiki—Fable, Fable 2, Fable 3, and more, http://fable.wikia.com/wiki/Dog_ (Fable II), printed Sep. 6, 2012, 4 pages.
(Continued)

*Primary Examiner* — Jason T Yen
(74) *Attorney, Agent, or Firm* — Knobbe, Martens, Olson & Bear, LLP

(57) ABSTRACT

An approach to facilitating consideration-based non-player character counseling is provided. A non-player character counsel may be controlled within a game space to provide counsel content to users in exchange for virtual consideration purchased with real world money. For example, responsive to reception of adequate virtual consideration from a first user, the non-player character counsel may be controlled to provide a first set of counsel content to the first user in the game space. The first set of counsel content may be a subset of the counsel content provided by the non-player character counsel to the users in the game space. The counsel content may include instructions for and/or demonstrations of activities to be performed by a first character under control of the first user in the game space.

18 Claims, 3 Drawing Sheets

(51) Int. Cl.
*A63F 13/86* (2014.01)
*A63F 13/85* (2014.01)

(56) References Cited

U.S. PATENT DOCUMENTS

| | | | |
|---|---|---|---|
| 2005/0192071 A1* | 9/2005 | Matsuno | A63F 13/12 463/1 |
| 2006/0148545 A1 | 7/2006 | Rhyne | |
| 2007/0087797 A1 | 4/2007 | Van Luchene | |
| 2007/0087815 A1 | 4/2007 | VanLuchene | |
| 2007/0099687 A1* | 5/2007 | Gerson | G07F 17/32 463/16 |
| 2009/0098919 A1 | 4/2009 | Yuji | |
| 2009/0319286 A1 | 12/2009 | Finn | |
| 2010/0017260 A1 | 1/2010 | Hamilton, II | |
| 2010/0083139 A1 | 4/2010 | Dawson | |
| 2010/0233667 A1* | 9/2010 | Wilson | G09B 7/00 434/362 |
| 2011/0086685 A1 | 4/2011 | Schugar | |
| 2011/0230258 A1 | 9/2011 | VanLuchene | |
| 2012/0015699 A1* | 1/2012 | Kalvachev | A63F 13/00 463/1 |
| 2012/0252570 A1 | 10/2012 | Kwant | |
| 2012/0283014 A1 | 11/2012 | Van Luchene | |
| 2012/0289328 A1 | 11/2012 | Harp | |
| 2013/0005417 A1 | 1/2013 | Schmidt | |
| 2013/0005471 A1 | 1/2013 | Chung | |
| 2013/0116046 A1* | 5/2013 | Manton | A63F 13/00 463/31 |
| 2013/0260890 A1 | 10/2013 | Nuzzi | |
| 2013/0288757 A1 | 10/2013 | Guthridge | |
| 2014/0113708 A1* | 4/2014 | Lee | G07F 17/32 463/25 |
| 2014/0122702 A1 | 5/2014 | Jung | |
| 2015/0269813 A1 | 9/2015 | Severance | |

OTHER PUBLICATIONS

"Pet" online article, Pet—League of Legends Wiki—Champions, Items, Strategies, and many . . . , http://leagueoflegends.wikia.com/wiki/Pet, printed Sep. 5, 2012, 2 pages.

MMOSITE, Waren Story Mercenary System, May 16, 2012, http://feature.mmosite.com/warenstory/mercenary.shtml (4 pgs).

* cited by examiner

CONSIDERATION-BASED NON-PLAYER CHARACTER COUNSELING

FIELD OF THE DISCLOSURE

This disclosure relates generally to consideration-based non-player character counseling, for instance, using virtual consideration purchased with real world money.

BACKGROUND

Typically, a game may utilize non-player characters to provide users with tutorials to get users acquainted with basic gameplay and game features. Such tutorials may, for instance, be employed to improve user experience by mitigating potential user frustration associated with learning and understanding game basics. Nonetheless, despite the initial tutorials, a user's game progress may still become stagnant or hindered when the user is unaware of the next steps, follows poor strategies that lead to mistakes, lacks sufficient determination, etc. Among other issues, such circumstances may lead to user frustration with the game, which may result in a reduction of users that play the game.

SUMMARY

One aspect of the disclosure relates to a system configured to facilitate consideration-based non-player character counseling, in accordance with one or more implementations. In exemplary implementations, a non-player character within a game space may act as a counsel to users in the game space in exchange for virtual consideration that is purchased with real world money. In exchange for adequate virtual consideration, the non-player character may, for instance, assist users in the game space with activities to be performed by characters under control of those users. As indicated, due to a number of reasons, a user's game progress may become stagnant or hindered, potentially leading to user frustration and inactivity of that user. Among other benefits, consideration-based non-player character counseling may help users overcome stagnant or hindered game progress, allow the users to accelerate their game progress, improve the users' rankings in the game, and/or facilitate generation of revenue from the counseling.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate consideration-based non-player character counseling. The computer program modules may include one or more of a game module, a counseling control module, a counseling cost module, an account manager module, a counseling assessment module, and/or other modules. In some implementations, the client computing platforms may be configured to execute one or more computer program modules that are the same as or similar to the computer program modules of the server(s) to facilitate consideration-based non-player character counseling.

The game module may be configured to execute an instance of a game space. The game module may be configured to facilitate presentation of views of the game space to users. The game space may be configured to facilitate interaction of the users with the game space, non-player characters of the game space, and/or each other by performing operations in the game space in response to commands received from the users. The users may include a first user. The non-player characters may include one or more character counsels. The character counsels may include a first character counsel.

The counseling control module may be configured to control a first character counsel within the game space to provide counsel content to the users in exchange for virtual consideration. The virtual consideration may, for instance, be virtual consideration that is purchased with real world money. In some implementations, the counseling control module may be configured such that, responsive to reception of adequate virtual consideration from the first user, the first character counsel is controlled to provide a first set of counsel content to the first user in the game space. The first set of counsel content may be a subset of the counsel content provided by the first character counsel to the users in the game space. The counsel content may include instructions for and/or demonstrations of activities to be performed by a first character under control of the first user in the game space.

In certain implementations, counsel content may include performance of one or more of the activities by the first character counsel on behalf of the first user. In some implementations, the counseling control module may be configured to control the first character counsel to perform one or more of the activities on behalf of the first user with a level of performance that corresponds to an amount of virtual consideration received from the first user. The first set of counsel content may, for instance, include the performance by the first character counsel at the corresponding level of performance.

The counseling cost module may be configured to manage costs associated with the counsel content such that the adequate virtual consideration may be based on one or more cost criteria. The cost criteria may include a hiring time period, a counseling type, an amount of counseling, a level of performance related to the counseling, difficulty of an activity to which the first set of counsel content is targeted, a level associated with the first user, and/or other criteria.

The account manager module may be configured to reduce the amount of virtual consideration controlled by the first user by an amount corresponding to the adequate virtual consideration responsive to a request by the first user for the first set of counsel content.

The counseling assessment module may be configured to assess user information associated with the first user. The counseling control module may be configured such that the first set of counsel content is suggested to the first user based on the assessment of the user information. By way of example, the user information may include progress information, history information, behavior information, preference information, and/or other information associated with the first user.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and

DETAILED DESCRIPTION

Figure 1:
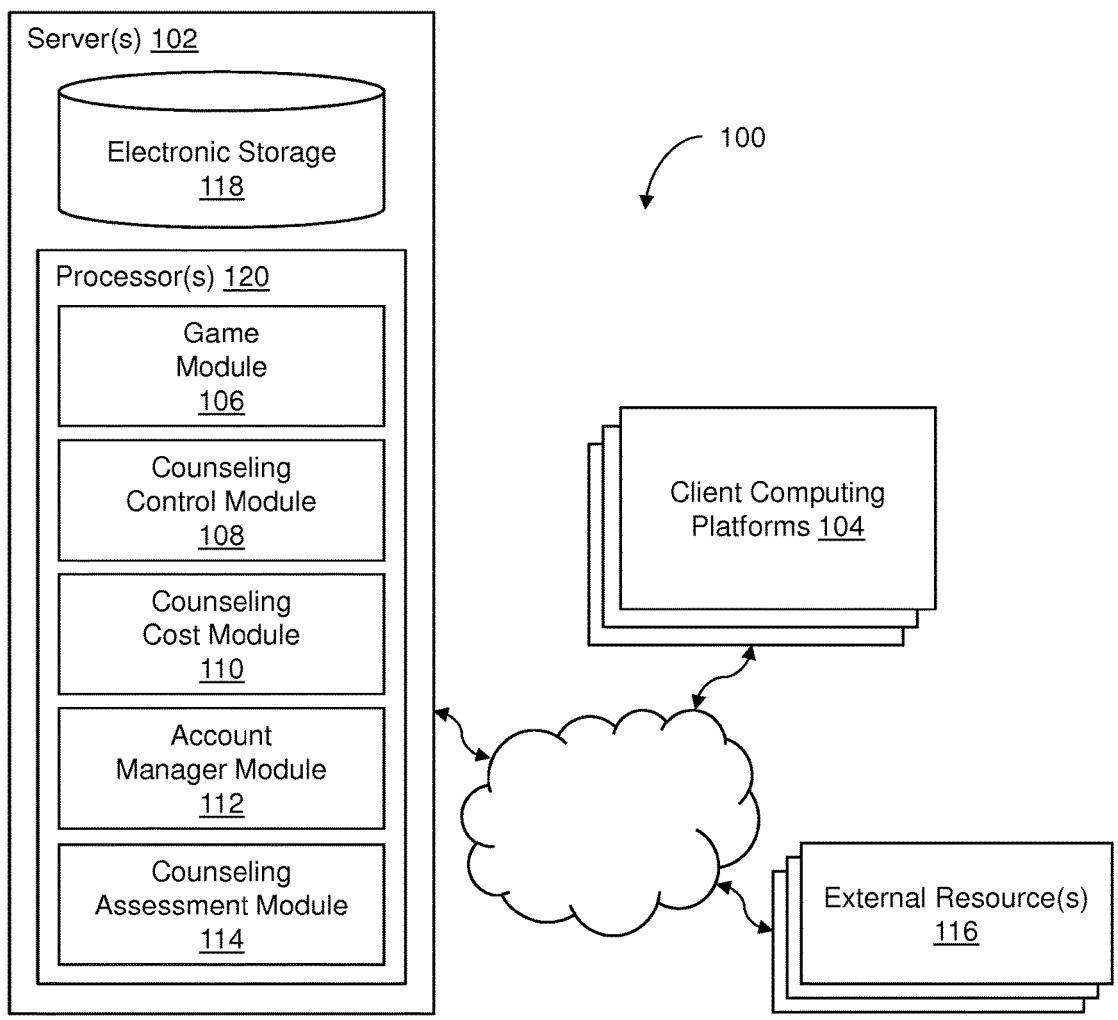
FIG. 1 illustrates a system configured to facilitate consideration-based non-player character counseling, in accordance with one or more implementations.

FIG. 1 illustrates a system 100 configured to facilitate consideration-based non-player character counseling, in accordance with one or more implementations. In exemplary implementations, a non-player character within a game space may act as a counsel to users in the game space in exchange for virtual consideration that is purchased with real world money. In exchange for adequate virtual consideration, the non-player character may, for instance, assist users in the game space with activities to be performed by characters under control of those users. It should be noted that references to a user within a virtual space, game space, and/or game may refer to a user-controlled character, set of user-controlled characters, or other entities under the direct control of the user. As used herein, "purchased with real world money" refers to directly purchasing with real world money, purchasing with virtual items that were purchased with real world money, and/or purchasing with virtual items that were purchased via a chain of purchases that includes a purchase with real world money. For example, virtual consideration that is purchased with real world money may not include virtual items that are provided to a user simply in response to the in-space achievements of the user.

As an example, responsive to reception of adequate virtual consideration from a first user, the non-player character may be controlled to provide the first user with instructions for and/or demonstrations of activities to be performed by a first character under control of the first user in the game space. As another example, responsive to the reception of the adequate virtual consideration, the non-player character may be controlled to perform one or more of the activities on behalf of the first user. It should be noted that, while the first user may already satisfy all of the requirements (e.g., relating to access, resources, items, etc.) for the first character to perform a certain activity, the user may nonetheless fail to successfully perform that activity as a result of a lack of knowledge of the user, poor strategies of the user, insufficient determination of the user, and/or other reasons. By providing consideration-based non-player character counseling, game developers and/or providers may offer counseling through non-player character counsels to help users overcome various game activities, enable the users to accelerate their game progress, improve the users' rankings in games, facilitate generation of revenue from the counseling, and/or provide other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate consideration-based non-player character counseling. The computer program modules may include one or more of a game module 106, a counseling control module 108, a counseling cost module 110, an account manager module 112, a counseling assessment module 114, and/or other modules. In some implementations, client computing platforms 104 may be configured to execute one or more computer program modules that are the same as or similar to the computer program modules of server(s) 102 to facilitate consideration-based non-player character counseling.

Game module 106 may be configured to execute an instance of a game space. In some implementations, the game space may be a virtual space. An instance of the game space may be an instance of the virtual space. An instance of the virtual space may be executed by computer modules to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user character being controlled by a user via client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may include a 2-dimensional topography. In other instances, the topography may include a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or one another. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-player characters in the virtual space and/or other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with one another through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

As such, the game space executed by game module 106 may be configured to facilitate interaction of the users with the game space, non-player characters of the game space, and/or each other by performing operations in the game space in response to commands received from the users. The non-player characters may include one or more character counsels. The character counsels may include a first character counsel. The users may include a first user. In various implementations, the first character counsel may be controlled by counseling control module 108 to follow the first user around within the game space (e.g., as a companion), to appear upon request by the first user, to be located at one or more positions within the game space, etc.

Counseling control module 108 may be configured to control the first character counsel within the game space to provide counsel content to the users in exchange for virtual consideration. The virtual consideration may, for instance, be virtual consideration that is purchased with real world money. In some implementations, counseling control module 108 may be configured such that, responsive to reception of adequate virtual consideration from the first user, the first character counsel is controlled to provide a first set of counsel content to the first user in the game space. The first set of counsel content may be a subset of the counsel content provided by the first character counsel to the users in the game space. The counsel content may include instructions for and/or demonstrations of activities to be performed by a first character under control of the first user in the game space. It should be noted that references to a user within a virtual space, game space, and/or game may refer to a user-controlled character, set of user-controlled characters, or other entities under the direct control of the user.

Figure 2:
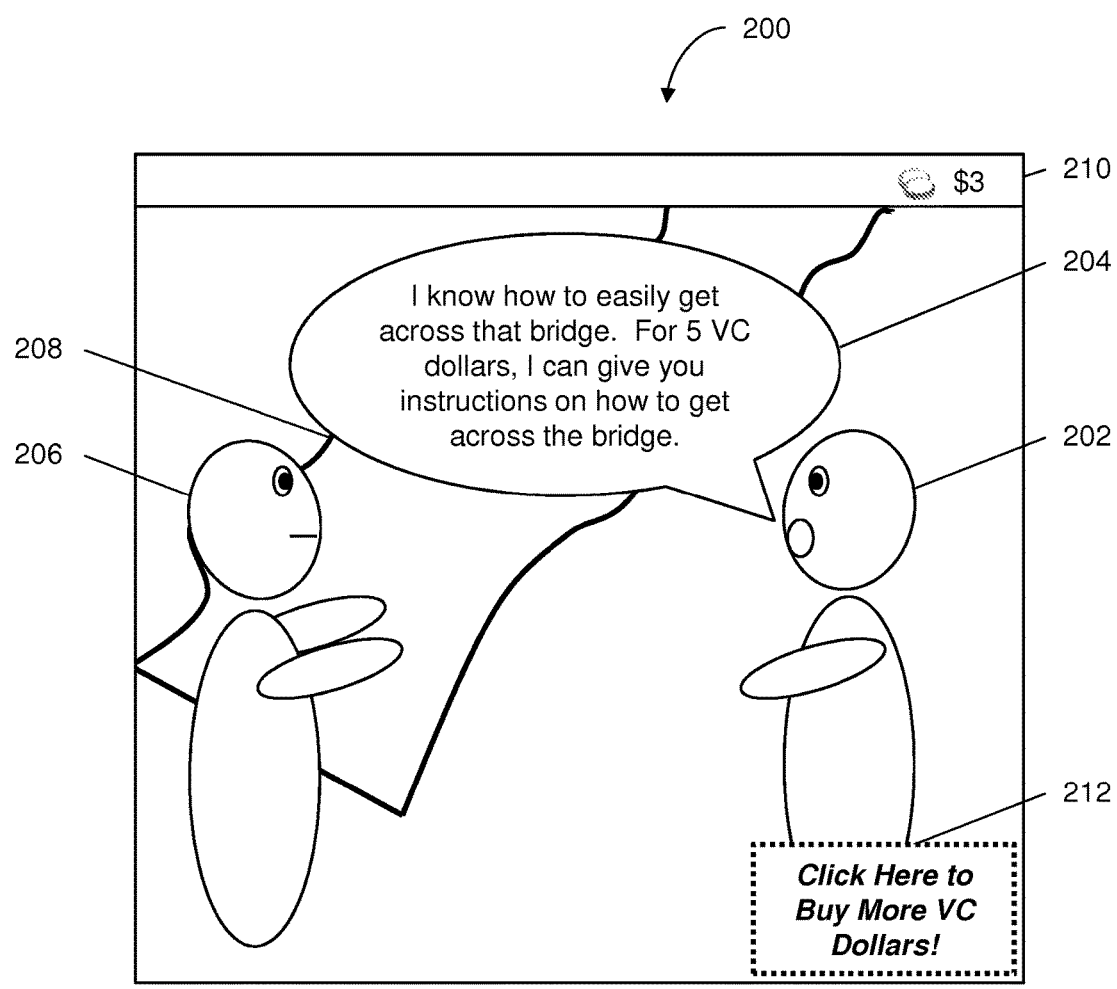
FIG. 2 illustrates a user interface depicting a non-player character counsel suggesting exchange of virtual consideration for a set of counsel content, in accordance with one or more implementations.

For example, FIG. 2 illustrates a user interface 200 depicting a non-player character counsel 202 suggesting exchange of virtual consideration for a set of counsel content, in accordance with one or more implementations. As shown by FIG. 2, character counsel 202 is suggesting an offer 204 to a user via a character 206 controlled by the user in a game space. In this scenario, offer 204 is an exchange between character counsel 202 and the user such that character counsel 202 provides the user with instructions (e.g., the set of counsel content) to easily get across a bridge 208 in the game space in exchange for five VC dollars from the user. VC dollars may, for instance, represent virtual consideration that is utilized by users in the game space to purchase and/or exchange for virtual goods and services within the game space. It should be noted that, while the user may already satisfy all of the requirements to initiate crossing of bridge 208 by character 206, the user may nonetheless prefer to pay five VC dollars for instructions from character counsel 202 to make the crossing of bridge 208 easier. The user may even be able to cross bridge 208 just as easily without character counsel 202, provided the user already possesses the skill, knowledge, power, and/or other characteristics that would enable the user to do so. The user may, for instance, prefer to pay for such instructions because crossing of bridge 208 is difficult for the user, and the user would rather not spend the time to figure out complexities associated with the crossing of bridge 208.

In another scenario, with respect to FIG. 2, character counsel 202 may offer to demonstrate to the user how the user can cross bridge 208 with ease in exchange for additional virtual consideration (e.g., three more VC dollars on top of the five VC dollars for the instructions). Because the demonstration by character counsel may offer more clarity than the instructions, the user may opt to provide the additional virtual consideration for the demonstration. For example, character counsel 202 may cross bridge 208 to demonstrate to the user the steps that the user's character 206 should take in order to effectively get across bridge 208.

As illustrated in FIG. 2, user interface 200 includes a bar 210 to indicate the amount of VC dollars that the user has in his/her account associated with the game space. In this scenario, the user currently has three VC dollars in his/her account, which would not be sufficient to cover the cost associated with offer 204. However, the user may purchase more VC dollars by clicking on notification 212 to exchange real world money for VC dollars. In this way, consideration-based non-player character counseling may be utilized to generate revenue, to accelerate users' game progress, and/or provide other benefits.

In certain implementations, counsel content may include performance of one or more of the activities by the first character counsel on behalf of the first user. For example, with respect to FIG. 2, the act of crossing bridge 208 may include avoiding certain areas of bridge 208 (e.g., to avoid falling through those areas), balancing on various areas of bridge 208 (e.g., to reduce swaying of bridge 208), defeating attackers on bridge 208, and/or performing other activities. In one scenario, character counsel 202 may offer to carry character 206 across bridge 208, defeat the attackers on bridge 208, and/or perform other activities relating to crossing bridge 208 in exchange for a certain amount of virtual consideration. In this way, the user may pay character counsel 202 to perform such activities so that the user does not have to manually control character 206 to perform those activities.

In some implementations, counseling control module 108 may be configured to control the first character counsel to perform one or more of the activities on behalf of the first user with a level of performance that corresponds to an amount of virtual consideration received from the first user.

The first set of counsel content may, for instance, include the performance by the first character counsel at the corresponding level of performance. As indicated, with respect to FIG. 2, the act of crossing bridge 208 may include avoiding certain areas of bridge 208, balancing on various areas of bridge 208, defeating attackers on bridge 208, and/or performing other activities. As suggested in the above scenario, character counsel 202 may offer to carry character 206 across bridge 208, defeat the attackers on bridge 208, and/or perform other activities relating to the crossing of bridge 208 in exchange for a certain amount of virtual consideration. In another scenario, character counsel 202 may offer to perform such activities on behalf of the user while equipped with improved gear, for instance, which enables character counsel 202 to perform the activities with higher levels of performance. Nonetheless, the offer to perform the activities with the improved gear on behalf of the user may be associated with higher costs. Thus, the level of performance with respect to the performance of the activities may be based on the amount of virtual consideration that the user agrees to pay and/or pays character counsel 202.

For example, still referring to FIG. 2, the improved gear may include anti-gravity booster boots that allows character counsel 202 to place less weight on bridge 208 during the crossing, lighter and more durable armor, advanced weapons, and/or other equipment. In some scenarios, the anti-gravity boots may speed up the crossing since character counsel 202 may not need to avoid weaker floorboards of bridge 208 that would break under normal weight of character counsel 202 and character 206 (e.g., if character counsel is carrying character 206 across bridge 208). The lighter armor may enable character counsel 202 to cross bridge 208 with better balance, which may decrease the probability that the user will lose supplies or other items carried by character 206 during the crossing (e.g., better balance during the crossing may reduce swaying of bridge 208 that tends to cause character 206 to drop items). The more durable armor and advanced weapons may enable character counsel 202 to defeat the attackers on bridge 208 more swiftly, which may decrease the probability that character 206 will be injured during the crossing and/or reduce the injuries to character 206 that occurs during the crossing. In various scenarios, each of the above-mentioned equipment may be associated with an additional cost and/or an increase in the level of performance by character counsel 202 during the crossing (e.g., compared with crossing without such equipment). The equipment may, for instance, be mixed and matched to take advantage of the various increases in the level of performance, but may be associated with higher costs as a result.

Counseling cost module 110 may be configured to manage costs associated with the counsel content such that the adequate virtual consideration may be based on one or more cost criteria. The cost criteria may include a hiring time period, a counseling type, an amount of counseling, a level of performance related to the counseling, difficulty of an activity to which the first set of counsel content is targeted, a level associated with the first user (e.g., a level of the first user, a level of the first character under control of the first user, etc.), and/or other criteria. In certain implementations, costs of counseling may be a rate per period of time (e.g., five VC dollars per hour), a rate based on counseling for individual activities, and/or a rate based on other criteria.

In one scenario, with respect to a Player vs. Player game space, a character counsel may be automatically controlled to maintain a user's city on behalf of the user for two hours while the user is away (e.g., sleeping, on a date, etc.) with "good" performance in exchange for payment of ninety VC dollars by the user. However, the payment may be less if the number of hours that the character counsel is to maintain the city on behalf of the user is decreased. The payment may be more if the number of hours that the character counsel is to maintain the city on behalf of the user is increased. The payment may be less if the performance level is decreased. The payment may be more if the performance level is increased. For example, with respect to performance levels, "good" performance may be a level of performance that is lower than "excellent" performance, but higher than "average" performance. A city that is being maintained by a character counsel with "good" performance may, for instance, be able to withstand an attack better than a city that is being maintained by a character counsel with "average" performance. On the other hand, a city that is being maintained by a character counsel with "good" performance may not be able to withstand an attack as well as a city that is being maintained by a character counsel with "excellent" performance.

In another scenario, a character counsel may be controlled to provide a user with a demonstration of an activity in exchange for payment of five VC dollars by the user. However, the payment may be less if the character counsel is controlled instead to provide the user with instructions for performing the activity. The payment may be more if the character counsel is controlled instead to perform the activity on behalf of the user. In yet another scenario, a character counsel may be controlled to provide a user with a demonstration of an activity that is associated with an "average" level of difficulty in exchange for payment of five VC dollars by the user. However, the payment for the demonstration may be less if the activity is instead associated with a "low" level of difficulty. The payment for the demonstration may be more if the activity is instead associated with a "high" level of difficulty.

Account manager module 112 may be configured to reduce the amount of virtual consideration controlled by the first user by an amount corresponding to the adequate virtual consideration responsive to a request by the first user for the first set of counsel content. For example, with respect to FIG. 2, if the user purchases ten additional VC dollars (e.g., by clicking on notification 212), the user will have thirteen VC dollars in the user's account associated with the game space. Upon a request by the user for the set of counsel content associated with offer 204, amount manager module 112 may reduce the thirteen VC dollars in the user's account to eight VC dollars to account for the cost of the exchange specified in offer 204.

Counseling assessment module 114 may be configured to assess user information associated with the first user. Counseling control module 108 may be configured such that the first set of counsel content is suggested to the first user based on the assessment of the user information. By way of example, the user information may include progress information, history information, behavior information, preference information, and/or other information associated with the first user. Progress information may include a level of the user, tasks to be completed by the user for the user to reach a target objective, and/or other information relating to progress of the user. As used herein, activities to be performed by characters under control of users may include a target objective, tasks to be performed to reach a target objective, and/or other activities within the game space. History information may include target objectives completed by the user, tasks of non-completed target objectives that have been performed by the user, sets of counsel content that have been provided to the user, amount of virtual consideration exchanged for the sets of counsel content, non-player character counsels that interacted with the user, non-player character counsels that provided the sets of counsel content to the user, and/or other information relating to previous events associated with the user. Behavior information may include game play styles associated with the user, types of counsel content provided to the user in exchange for virtual consideration, types of counsel content declined by the user, probabilities with respect to the willingness of the user to give virtual consideration in exchange for various types of counsel content, and/or other information relating to the behavior of the user. Preference information may include indications by the user relating to desired/undesired types of counsel content, indications by the user relating to virtual consideration that the user is willing to exchange for various types of counsel content, and/or other information indicating preference of the user.

Server(s) 102, client computing platforms 104, external resources 116, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 116, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 116, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

In some implementations, server(s) 102 may include an electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. In some implementations, the electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 and/or client computing platforms 104 to function as described herein. It should be noted that, in certain implementations, electronic storage 118 may be a part of server(s) 102, a part of a given client computing platform 104, and/or a separate component of system 100.

In some implementations, processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 106, 108, 110, 112, 114, and/or other modules. Processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that is the same as or similar to the computer program modules of server(s) 102. Client computing platform 104 may include one or more processors that are the same or similar to processor(s) 120 of server(s) 102 to execute such computer program modules of client computing platform 104.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 3:
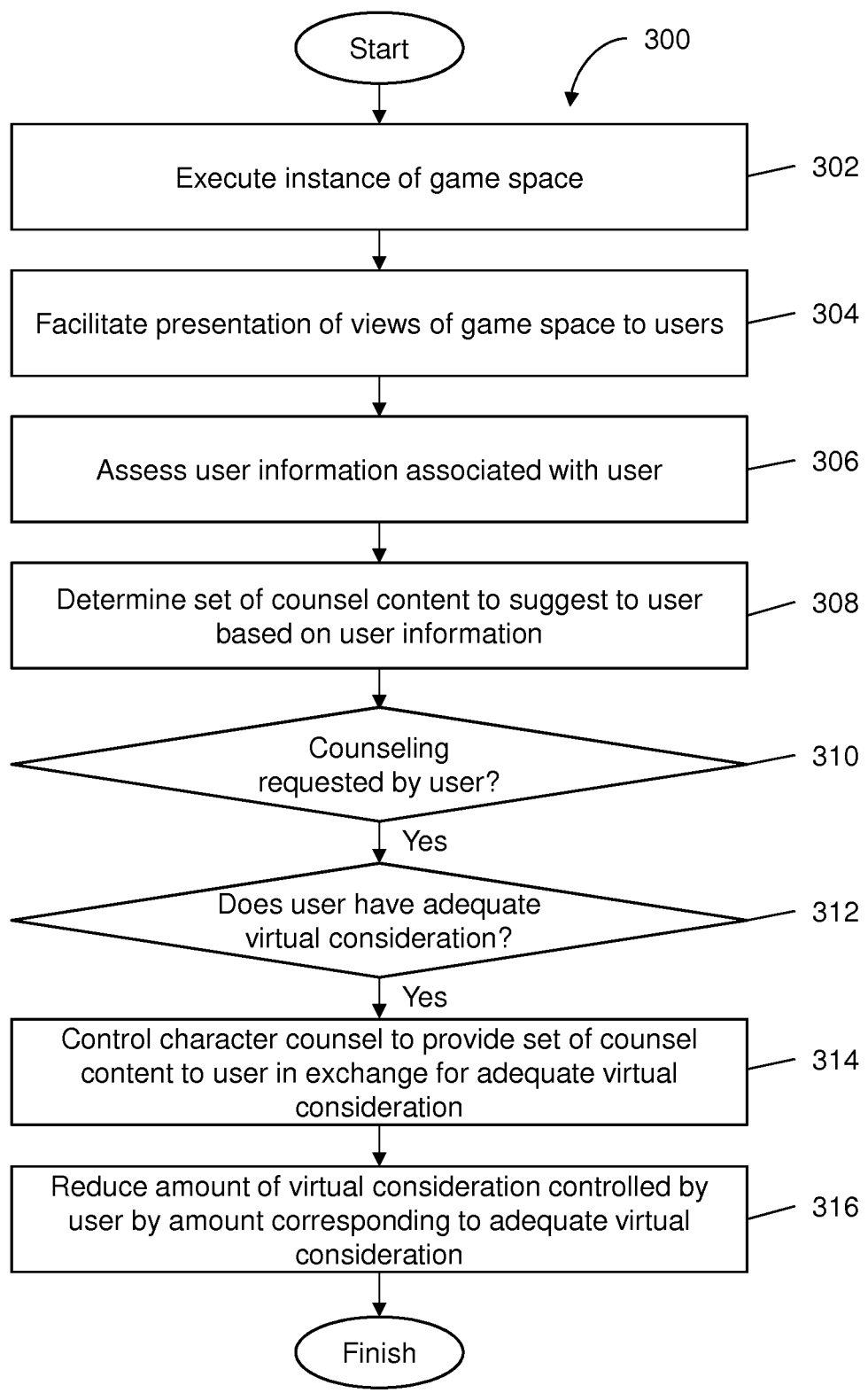
FIG. 3 illustrates a method for facilitating consideration-based non-player character counseling, in accordance with one or more implementations.

FIG. 3 illustrates a method for consideration-based non-player character counseling, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a game space may be executed. The game space may include users, characters controlled by the users (e.g., player characters), and/or non-player characters. Non-player characters may, for instance, include character counsels that may provide counsel content to the users in exchange for virtual consideration that is purchased with real world money. Operation 302 may be performed by a game module that is the same as or similar to game module 106, in accordance with one or more implementations.

At an operation 304, presentation of views of the game space to the users may be facilitated. The game space may be configured to facilitate interaction of the users with the game space, non-player characters of the game space, and/or each other by perform operations in the game space in response to commands received from the users. For example, the interactions may be facilitated for the users via the user-controlled characters. Operation 304 may be performed by a game module that is the same as or similar to game module 106, in accordance with one or more implementations.

At an operation 306, user information associated with a user may be assessed. For example, the user information may include progress information, history information, behavior information, preference information, and/or other information associated with the user. Progress information may include a level of the user, tasks to be completed by the user for the user to reach a target objective, and/or other information relating to progress of the user. As used herein, activities to be performed by characters under control of users may include a target objective, tasks to be performed to reach a target objective, and/or other activities within the game space. History information may include target objectives completed by the user, tasks of non-completed target objectives that have been performed by the user, sets of counsel content that have been provided to the user, amount of virtual consideration exchanged for the sets of counsel content, non-player character counsels that interacted with the user, non-player character counsels that provided the sets of counsel content to the user, and/or other information relating to previous events associated with the user. Behavior information may include game play styles associated with the user, types of counsel content provided to the user in exchange for virtual consideration, types of counsel content declined by the user, probabilities with respect to the willingness of the user to give virtual consideration in exchange for various types of counsel content, and/or other information relating to the behavior of the user. Preference information may include indications by the user relating to desired/undesired types of counsel content, indications by the user relating to virtual consideration that the user is willing to exchange for various types of counsel content, and/or other information indicating preference of the user. Operation 306 may be performed by a counseling assessment module that is the same as or similar to counseling assessment module 114, in accordance with one or more implementations.

At an operation 308, a set of counsel content for the user may be determined based on the user information. In response to such a determination, the set of counsel content may be suggested to the user. The set of counsel content may, for instance, be suggested to the user via a non-player character counsel within the game space. Operation 308 may be performed by a counseling assessment module that is the same as or similar to counseling assessment module 114, in accordance with one or more implementations.

At an operation 310, a determination of whether counseling is requested by the user may be effectuated. Operation 310 may be performed by a counseling control module that is the same as or similar to counseling control module 108, in accordance with one or more implementations. Responsive to a determination that the user requested counseling, method 300 may proceed to an operation 312.

At operation 312, a determination of whether the user has adequate virtual consideration for the requested counseling may be effectuated. For example, the suggested counsel content may be associated with a cost equal to a certain amount of virtual consideration. If the user requested the suggested set of counsel content, a determination of whether the user controls at least the certain amount of virtual consideration within the game space may be effectuated. Such a determination may, for instance, be effectuated by checking a user account associated with the user that indicates the amount of virtual consideration controlled by the user within the game space. Operation 312 may be performed by a counseling control module that is the same as or similar to counseling control module 108, in accordance with one or more implementations. Responsive to a determination that the user has adequate virtual consideration for the requested counseling, method 300 may proceed to an operation 314.

At an operation 314, a character counsel of the game space may be controlled to provide the set of counsel content (e.g., the requested counseling) to the user in exchange for the adequate virtual consideration. As indicated, the adequate virtual consideration may be an amount of virtual consideration within the game space that is purchased with real world money. Operation 314 may be performed by a counseling control module that is the same as or similar to counseling control module 108, in accordance with one or more implementations.

At an operation 316, the amount of virtual consideration controlled by the user may be reduced by an amount corresponding to the adequate virtual consideration. Operation 316 may be performed by an account manager module that is the same as or similar to account manager module 112, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating consideration-based non-player character counseling, the system comprising:
one or more processors configured by machine-readable instructions to:
an instance of a game space, and to use the instance to generate game state information that is transmitted to client computing platforms over a network to facilitate presentation of views of a virtual topography of the game space to users, wherein the game space is configured to facilitate interaction of the users with the virtual topography of the game space, virtual objects within the virtual topography of the game space, non-player characters within the virtual topography of the game space, and/or each other by performing operations in the game space in response to commands received over the network from the client computing platforms associated with the users, wherein the users include a first user, the non-player characters include one or more character counsels, and the one or more character counsels include a first character counsel, and wherein the first user controls a first character to perform actions in the game space;
assess progress information associated with the first user, wherein the progress information includes one or more tasks to be completed by the first user for the first user to reach one or more target objectives in the game space, wherein the one or more tasks include a first task that has not been completed by the first user, wherein the first task includes one or more activities to be performed by the first character under control of the first user in the game space;
receive commands from the client computing platform associated with the first user controlling operation of the first character within the virtual topography of the game space, such that, responsive to the commands, the first character interacts with the first character counsel, the first character requests that the first character counsel provides first counsel content, and the first character provides adequate virtual consideration to the first character counsel in exchange for the first counsel content; and
responsive to reception of the adequate virtual consideration from the first user, control execution of actions by the first character counsel within the virtual topography of the game space to provide first counsel content to the first user in the game space, wherein the first counsel content includes instructions for and/or demonstrations of the one or more activities included in the first task to be performed by a first character under control of the first user in the virtual topography of the game space.

2. The system of claim 1, wherein the one or more processors are configured by machine-readable instructions to manage costs associated with the first counsel content such that the adequate virtual consideration is based on one or more of a hiring time period, a counseling type, an amount of counseling, a level of performance relating to the counseling, difficulty of an activity to which the first counsel content is targeted, or a level associated with the first user.

3. The system of claim 1, wherein the one or more processors are configured by machine-readable instructions to manage user accounts that include a first account associated with the first user that indicates an amount of virtual consideration controlled by the first user.

4. The system of claim 3, wherein the one or more processors are configured by machine-readable instructions to reduce the amount of virtual consideration controlled by the first user by an amount corresponding to the adequate virtual consideration responsive to a request by the first user for the first counsel content.

5. The system of claim 1, wherein the one or more processors are configured by machine-readable instructions to assess user information associated with the first user, such that the first counsel content is suggested to the first user based on the assessment of the user information.

6. The system of claim 5, wherein the user information includes history information.

7. The system of claim 5, wherein the user information includes one or more of behavior information or preference information.

8. The system of claim 1, wherein the first counsel content includes performance of one or more of the activities by the first character counsel on behalf on the first user.

9. The system of claim 8, wherein the one or more processors are configured by machine-readable instructions to control the first character counsel to perform one or more of the activities on behalf of the first user with a level of performance that corresponds to an amount of virtual consideration received from the first user, and wherein the first counsel content include the performance by the first character counsel at the corresponding level of performance.

10. A method for facilitating consideration-based non-player character counseling, the method being implemented in a computer system that includes one or more processors configured by machine-readable instructions, the method comprising:
executing an instance of a game space and using the instance to generate game state information that is transmitted to client computing platforms over a network;
facilitating presentation of views of a virtual topography of the game space to users, wherein the game space is configured to facilitate interaction of the users with the virtual topography of the game space, virtual objects within the virtual topography of the game space, non-player characters within the virtual topography of the game space, and/or each other by performing operations in the game space in response to commands received over the network from the client computing platforms associated with the users, wherein the users include a first user, the non-player characters include one or more character counsels, and the one or more character counsels include a first character counsel, and wherein the first user controls a first character to perform actions in the game space;
assessing progress information associated with the first user, wherein the progress information includes one or more tasks to be completed by the first user for the first user to reach one or more target objectives in the game space, wherein the one or more tasks include a first task that has not been completed by the first user, wherein the first task includes one or more activities to be performed by the first character under control of the first user in the game space; and
receiving commands from the client computing platform associated with the first user controlling operation of the first character within the virtual topography of the game space, such that, responsive to the commands, the first character interacts with the first character counsel, the first character requests that the first character counsel provides first counsel content, and the first character provides adequate virtual consideration to the first character counsel in exchange for the first counsel content;

controlling execution of actions by the first character counsel within the virtual topography of the game space to provide counsel content to the users in exchange for virtual consideration such that, responsive to reception of adequate virtual consideration from the first user, the first character counsel is controlled to provide first counsel content to the first user in the game space, wherein the first counsel content includes instructions for and/or demonstrations of the one or more activities included in the first task to be performed by a first character under control of the first user in the virtual topography of the game space.

11. The method of claim 10, comprising managing costs associated with the counsel content such that the adequate virtual consideration is based on one or more of a hiring time period, a counseling type, an amount of counseling, a level of performance relating to the counseling, difficulty of an activity to which the first counsel content is targeted, or a level associated with the first user.

12. The method of claim 10, comprising managing user accounts that include a first account associated with the first user that indicates an amount of virtual consideration controlled by the first user.

13. The method of claim 12, comprising reducing the amount of virtual consideration controlled by the first user by an amount corresponding to the adequate virtual consideration responsive to a request by the first user for the first counsel content.

14. The method of claim 10, comprising assessing user information associated with the first user, wherein the first counsel content is suggested to the first user based on the assessment of the user information.

15. The method of claim 14, wherein the user information includes history information.

16. The method of claim 14, wherein the user information includes one or more of behavior information or preference information.

17. The method of claim 10, wherein the counsel content includes performance of one or more of the activities by the first character counsel on behalf on the first user.

18. The method of claim 17, comprising controlling the first character counsel to perform one or more of the activities on behalf of the first user with a level of performance that corresponds to an amount of virtual consideration received from the first user, wherein the first counsel content include the performance by the first character counsel at the corresponding level of performance.

* * * * *